(12) United States Patent
Ferren et al.

(10) Patent No.: US 9,141,199 B2
(45) Date of Patent: *Sep. 22, 2015

(54) INTELLIGENT GRAPHICS INTERFACE IN A HANDHELD WIRELESS DEVICE

(75) Inventors: Bran Ferren, Beverly Hills, CA (US); Schawn A. Jasmann, Los Angeles, CA (US); Morgan J. Buck, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 706 days.

This patent is subject to a terminal disclaimer.

(21) Appl. No.: 13/376,631

(22) PCT Filed: Jun. 9, 2010

(86) PCT No.: PCT/US2010/037994
§ 371 (c)(1),
(2), (4) Date: Jan. 31, 2012

(87) PCT Pub. No.: WO2010/147824
PCT Pub. Date: Dec. 23, 2010

(65) Prior Publication Data
US 2012/0190408 A1    Jul. 26, 2012

Related U.S. Application Data

(60) Provisional application No. 61/187,520, filed on Jun. 16, 2009.

(51) Int. Cl.
*H04W 4/00* (2009.01)
*G06F 3/02* (2006.01)
(Continued)

(52) U.S. Cl.
CPC ............. *G06F 3/02* (2013.01); *G02B 13/009* (2013.01); *G02B 13/0065* (2013.01); *G03B 3/00* (2013.01);
(Continued)

(58) Field of Classification Search
CPC ... H04M 1/72519; G06F 3/0488; G06F 3/016
USPC ............... 455/566; 345/173; 715/702, 849
See application file for complete search history.

(56) References Cited

U.S. PATENT DOCUMENTS

| 5,452,414 A | 9/1995 | Rosendahl et al. |
|---|---|---|
| 7,134,095 B1 | 11/2006 | Smith et al. |

(Continued)

FOREIGN PATENT DOCUMENTS

| CN | 1398366 | 2/2003 |
|---|---|---|
| CN | 1670679 | 9/2005 |

(Continued)

OTHER PUBLICATIONS

PCT/US2010/037794, Written Opinion mailed Jan. 24, 2011, 7 pages.
(Continued)

*Primary Examiner* — George Eng
*Assistant Examiner* — Muthuswamy Manoharan
(74) *Attorney, Agent, or Firm* — Blakely, Sokoloff, Taylor & Zafman LLP

(57) ABSTRACT

Various embodiments of the invention may allow applications and information to be clustered together in ways that simplify and automate various tasks. Other embodiments may present a graphical user interface to the user that allows the user to choose from a matrix of information categories and applications that can help provide that information. Still other embodiments may provide different user interface methods based on status awareness.

12 Claims, 8 Drawing Sheets

(51) Int. Cl.

| | | |
|---|---|---|
| G02B 13/00 | (2006.01) | |
| G03B 3/00 | (2006.01) | |
| G06F 3/041 | (2006.01) | |
| G06F 3/0484 | (2013.01) | |
| G06F 3/0488 | (2013.01) | |
| G06F 9/44 | (2006.01) | |
| G06F 21/32 | (2013.01) | |
| G06K 7/10 | (2006.01) | |
| G06Q 30/02 | (2012.01) | |
| H04N 5/232 | (2006.01) | |
| H04N 13/02 | (2006.01) | |
| G06F 3/023 | (2006.01) | |
| G06F 15/16 | (2006.01) | |
| H04M 1/725 | (2006.01) | |

(52) U.S. Cl.
CPC .......... *G06F 3/0237* (2013.01); *G06F 3/0416* (2013.01); *G06F 3/0418* (2013.01); *G06F 3/0488* (2013.01); *G06F 3/04842* (2013.01); *G06F 3/04883* (2013.01); *G06F 3/04886* (2013.01); *G06F 9/4443* (2013.01); *G06F 21/32* (2013.01); *G06K 7/10811* (2013.01); *G06Q 30/02* (2013.01); *H04N 5/232* (2013.01); *H04N 5/23296* (2013.01); *H04N 13/0239* (2013.01); *H04N 13/0242* (2013.01); *G06K 2207/1011* (2013.01); *H04M 1/72563* (2013.01); *H04M 2250/52* (2013.01)

(56) References Cited

U.S. PATENT DOCUMENTS

| | | | | |
|---|---|---|---|---|
| 7,461,343 | B2* | 12/2008 | Kates ............................ | 715/716 |
| 2003/0090524 | A1* | 5/2003 | Segerberg et al. ............ | 345/786 |
| 2003/0112279 | A1 | 6/2003 | Irimajiri | |
| 2003/0218637 | A1 | 11/2003 | Sloo et al. | |
| 2005/0039134 | A1 | 2/2005 | Wiggeshoff et al. | |
| 2005/0210410 | A1 | 9/2005 | Ohwa et al. | |
| 2006/0085757 | A1 | 4/2006 | Andre et al. | |
| 2006/0236251 | A1 | 10/2006 | Kataoka | |
| 2007/0157089 | A1 | 7/2007 | Van Os et al. | |
| 2007/0186186 | A1 | 8/2007 | Both | |
| 2007/0266411 | A1 | 11/2007 | Yamamoto et al. | |
| 2008/0165134 | A1 | 7/2008 | Krah | |

FOREIGN PATENT DOCUMENTS

| | | |
|---|---|---|
| CN | 1989480 | 6/2007 |
| CN | 101446883 | 6/2009 |
| JP | 11-102277 | 4/1999 |
| JP | 2003-157140 | 5/2003 |
| JP | 2003-333450 | 11/2003 |
| JP | 2006-031560 | 2/2006 |
| WO | WO-2008/030875 | 3/2008 |

OTHER PUBLICATIONS

Singapore Application No. 201107964-7, Written Opinion and Search report, mailed May 30, 2013, 40 pages.

* cited by examiner

INTELLIGENT GRAPHICS INTERFACE IN A HANDHELD WIRELESS DEVICE

RELATED APPLICATIONS

This application is related to and claims priority to U.S. Provisional Patent Application No. 61/187,520, filed Jun. 16, 2009, and International Application PCT/US2010/037994, and such applications are incorporated herein by reference.

BACKGROUND

Small handheld electronic devices have become ubiquitous in society, and people are becoming more and more dependent on these devices to obtain information, communicate with others, provide entertainment, and perform financial transactions, among other things. But as these devices become more and more capable, the graphical user interface (GUI) that a person may use to operate the device has remained relatively simple and crude, thus preventing the user from taking full advantage of the capabilities of the device.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
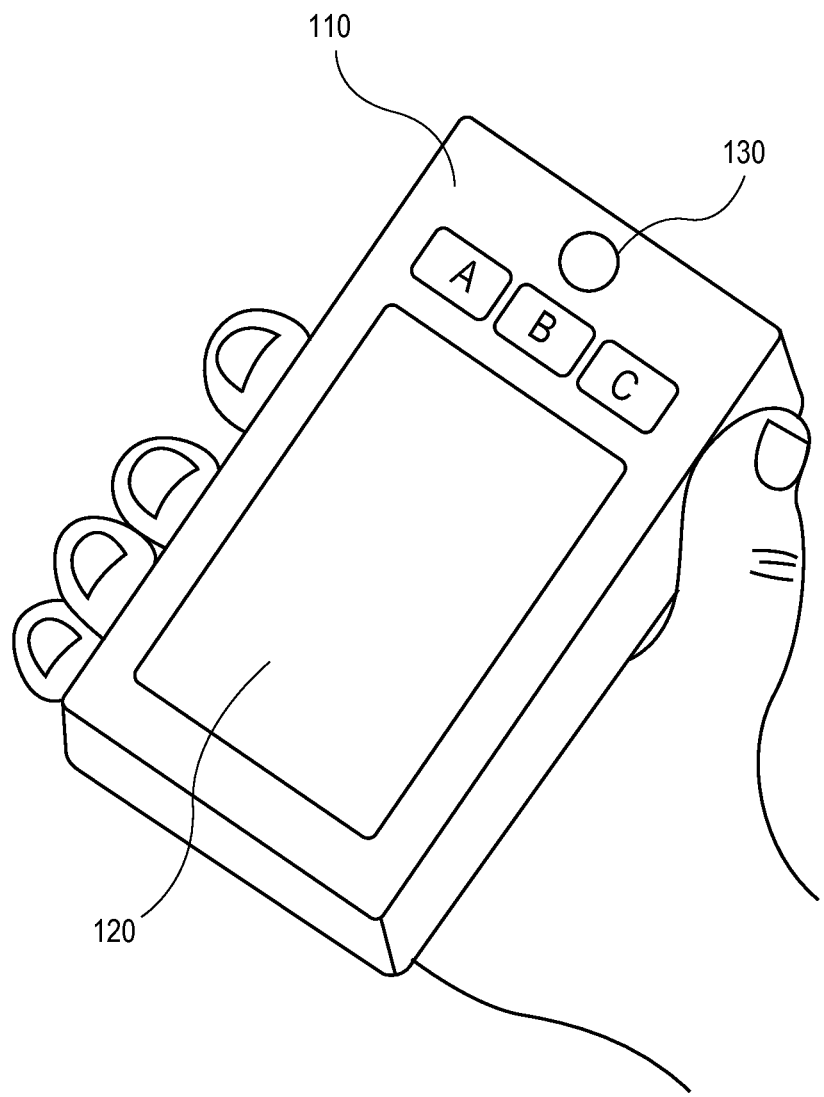
FIG. 1 shows a multi-function handheld device for wireless communications, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

In various portions of this document, the terms 'situation', 'context', and 'status', as well as derivatives of those terms, may be used. Within this document, these terms have specific meanings. 'Situation' pertains to external conditions, that is, information gathered by the various sensors in the device, or inferred about conditions external to the device based on those sensor inputs. Sensor inputs may include information gathered through radio communication, a camera, a microphone, a motion and/or orientation sensor, a light sensor, a temperature sensor, etc. Those conditions might be affected by the user's actions, but situational analysis in general does not consider the user's actions directly, only the sensed inputs indicating conditions external to the device. 'Situational awareness' involves an analysis of situation to determine situation-related factors that may be useful.

'Context' has to do with one or more of: where the user is, what the user is doing and/or is likely to do in the future, and the user's preferences. This may include considerations of what the device is doing (the mode in which the device is operating, the applications being run, etc.). Context may also consider historical factors, such as past activities, reactions, and decisions previously made under similar conditions. Because user actions may sometimes include a consideration of environmental factors, situation and context may sometimes overlap. For example, monitoring of the user's physiological state (temperature, stress level, breathing, etc.) might be considered situation (conditions external to the device) but would be also be considered context (what the user is or might be doing). 'Context awareness' involves an analysis of context to determine context-related factors that may be useful.

The term 'status' consists of situation, context, or both. So status awareness may consist of context awareness, situational awareness, or both. In situational awareness, context awareness, and status awareness, the factors being considered may be limited to those factors that are considered relevant or potentially relevant. On the other hand, when no particular results or type of information has been specified, all factors may be considered potentially relevant, and in some embodiments the device may monitor and process many such factors on an ongoing basis, even though there is no immediate need for that information.

Various embodiments of the invention may provide the user a convenient graphical user interface (GUI) to navigate through a matrix of categories and applications, may combine multiple applications and/or data in ways that are helpful to the device's user, and/or may automatically present information based on status awareness.

FIG. 1 shows a multi-function handheld user device for wireless communications, according to an embodiment of the invention. The illustrated device 110 is shown with various components, such as a touchscreen (a touch-sensitive display screen) 120 and buttons A, B, and C. Lens 130 is also shown which may be the externally visible portion of the device's camera. Other buttons, sensors, output devices, etc. may also be included but are not shown to avoid excessive clutter in the drawing.

Although the illustrated device 110 is depicted as having a particular shape, proportion, and appearance, with various elements located in particular locations, this is for example only and the various embodiments of the invention may not be limited to this particular physical configuration. For example, in some embodiments the buttons may have different sizes and/or different shapes than shown, be located elsewhere on the same side or on different sides of the device, etc. In some embodiments the overall shape of the device 110 may be different than shown. Device 110 may also include functionality for wireless communication, for various visual, audio, and physical inputs, and for various visual, audio, and physical outputs. Device 110 may include a processor, a memory, a camera, a radio for wireless communications with other devices, and various other components, which may be used to accomplish the functionality described in this document.

Category-Application Matirix in a Graphics User Interface

A multi-function handheld electronic device may perform many useful functions for the user, including communications, data retrieval/presentation, data analysis, scheduling, and others. These functions may be performed by specific application programs, each of which may be able to retrieve, process, and present data in a specific area of interest. However, a particular application program may be used in different areas of interest, and may be used in a different way in each area. In conventional devices, the user must choose the application program, may need to select the particular configuration of the application that applies to the particular area of interest, and then retrieve the data for that area before any useful processing can be started. In various embodiments of the invention, this process may be streamlined by presenting the user with a matrix of choices, in which one axis of the matrix represents areas of interest (labeled as 'categories' in these examples), and the other axis represents applications. The user may easily scroll through the matrix of category and application selections to find the appropriate combination, at which point the device may automatically retrieve the appropriate application, with the indicated configuration and data for that choice.

This matrix may be displayed in various forms. In some embodiments, the matrix may be presented as a virtual cube, which the user can visually rotate to reach different selections. Because the cube is virtual rather than physical, it may be able to present more (or less) than the six faces that a physical cube would be limited to. The cube may be rotated in the display in various ways, such as but not limited to: 1) rotating physical control wheels on the device, 2) a joystick, trackball, touchpad or touch button separate from the touchscreen, or similar multi-directional physical control device, 3) dragging a finger, stylus, or other element across a touchscreen that shows the cube, 4) a separate X-Y input device, 5) etc.

Figure 2A:
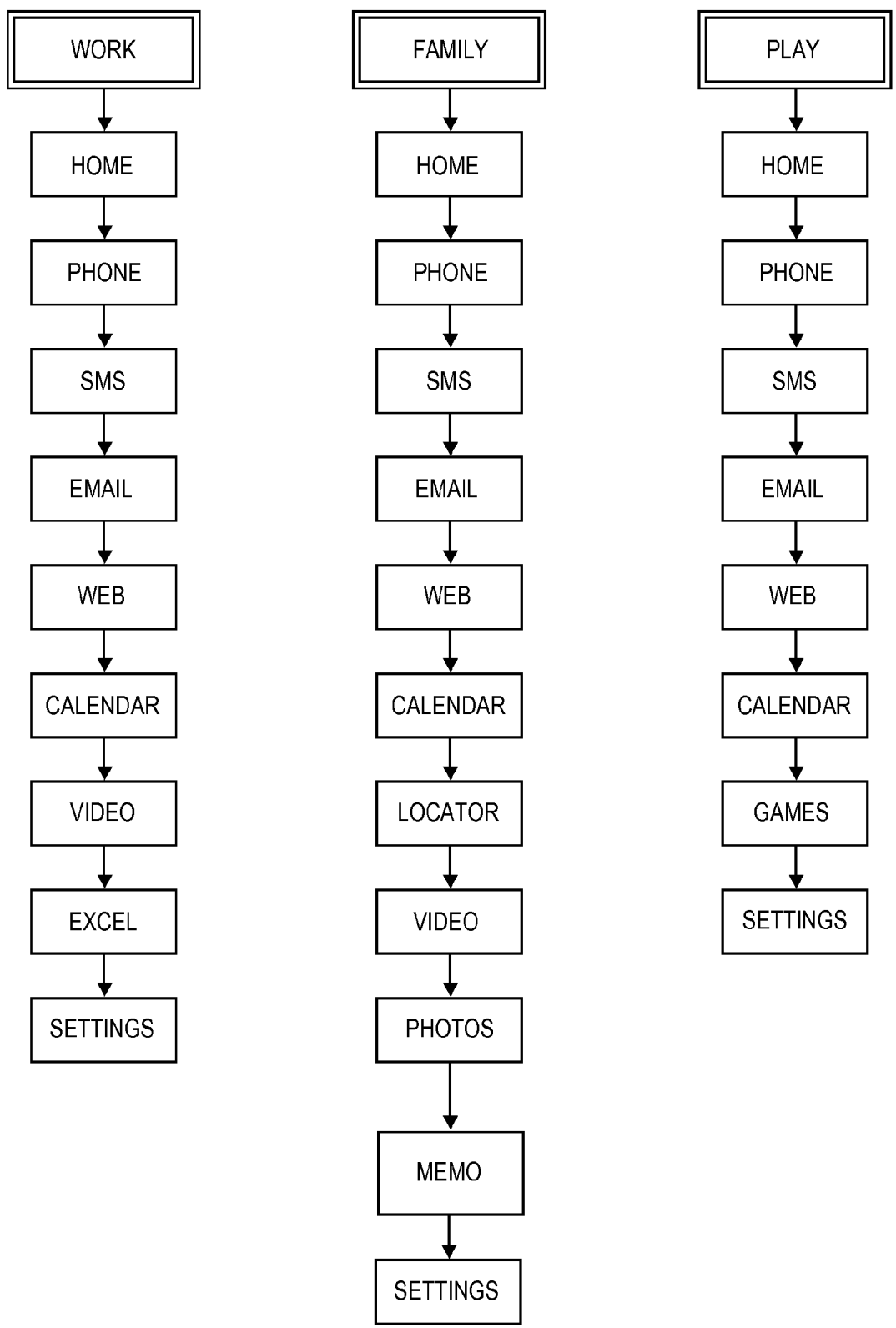
FIGS. 2A and 2B show category-application matrices, according to an embodiment of the invention.
Figure 2B:
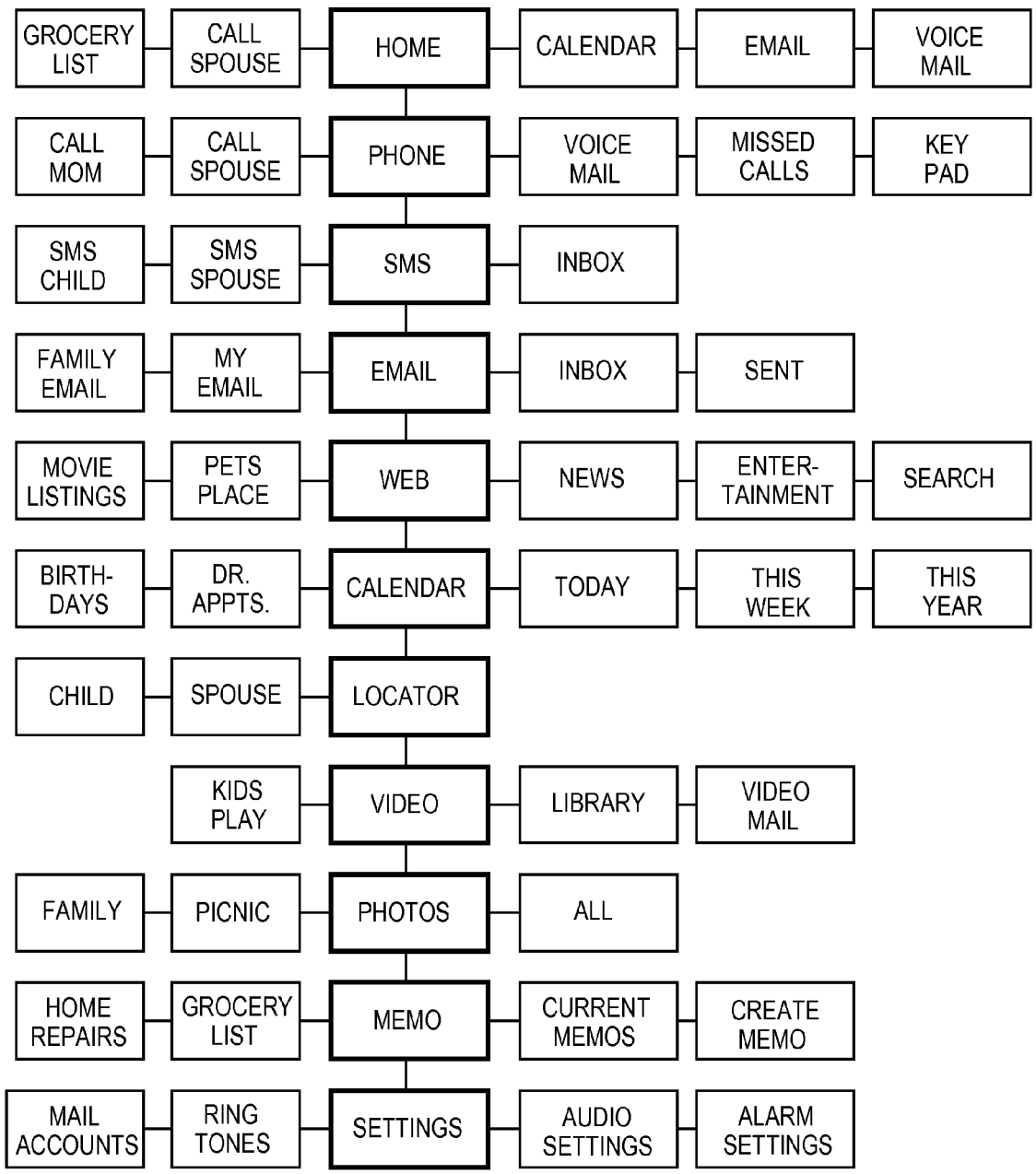

FIGS. 2A and 2B show multiple category-application matrices, according to an embodiment of the invention. The labels shown are for example only, and should not be considered a limitation on the possible labels that may be used. FIGS. 2A, 2B do not show the cube, but rather show an example of the categories and applications that may be selected with the cube. A visual example of the cube is shown in later figures. In the particular example of FIG. 2A, there are multiple modes that the device may operate in, labeled "Work", "Family", and "Play", (for example, to represent different areas of a user's life). There may be a different matrix for each mode, as the preferred functionality may be different within each mode. However, some embodiments may have only a single matrix. Within each particular matrix a column of categories is shown in FIG. 2A that may be accessed within that matrix. It is expected that some of the same categories may appear in multiple matrices, but that should not be considered a requirement. To avoid clutter in the drawing, only the categories are shown in FIG. 2A. FIG. 2B shows an expanded view of a single matrix (e.g., the Family matrix), with the row of applications that may be associated with each category. To select a particular application, the user may first select a category and then select an application within that category.

Although some of the applications shown are well known and understood to be available through particular software packages (e.g., "Voicemail", "Calendar", "Email Inbox", etc.), other indicated applications may actually be composed of a collection of software packages, and the indicated application may simply be a way to combine those packages in a useful way. In other instances, an application that is indicated in the matrix may represent a collection of data that is acted upon by one or more unnamed software packages, and/or may represent an action taken by the device. Thus the term 'application', as used herein, should not be defined too narrowly, but rather should include both software packages (either single or multiple) and actions taken by the device (including presentation of data to the user).

In some embodiments, the applications shown to the right of the category may be general applications (e.g., "inbox" for email), while the applications shown to the left may be very specific (e.g., "Pet's Place" on the web, or "Call Mom" on the phone).

In this example, there is a 'home' category that the device will display first when the matrix is accessed. In some embodiments, this may also be a 'favorites' category whose applications provides a shortcut to the most frequently used functionality, whether those favorites are determined automatically or specified by the user. This example also shows a 'settings' category to allow the user to specify various operational parameters, such as but not limited to: login ID's, ringtone settings, email accounts, visual themes, audible alerts, and maybe even the contents of this Category/Application matrix.

The categories and applications contained within the matrix and/or their labels may be defined by the user, may be predefined in the device, may be automatically generated by the device based on various parameters, or may be determined by some combination of these or other considerations. The order in which the various categories and applications are listed may be defined by the user, may be predefined in the device, may be automatically generated by the device based on various parameters, or may be determined by some combination of these or other considerations.

Figure 3:
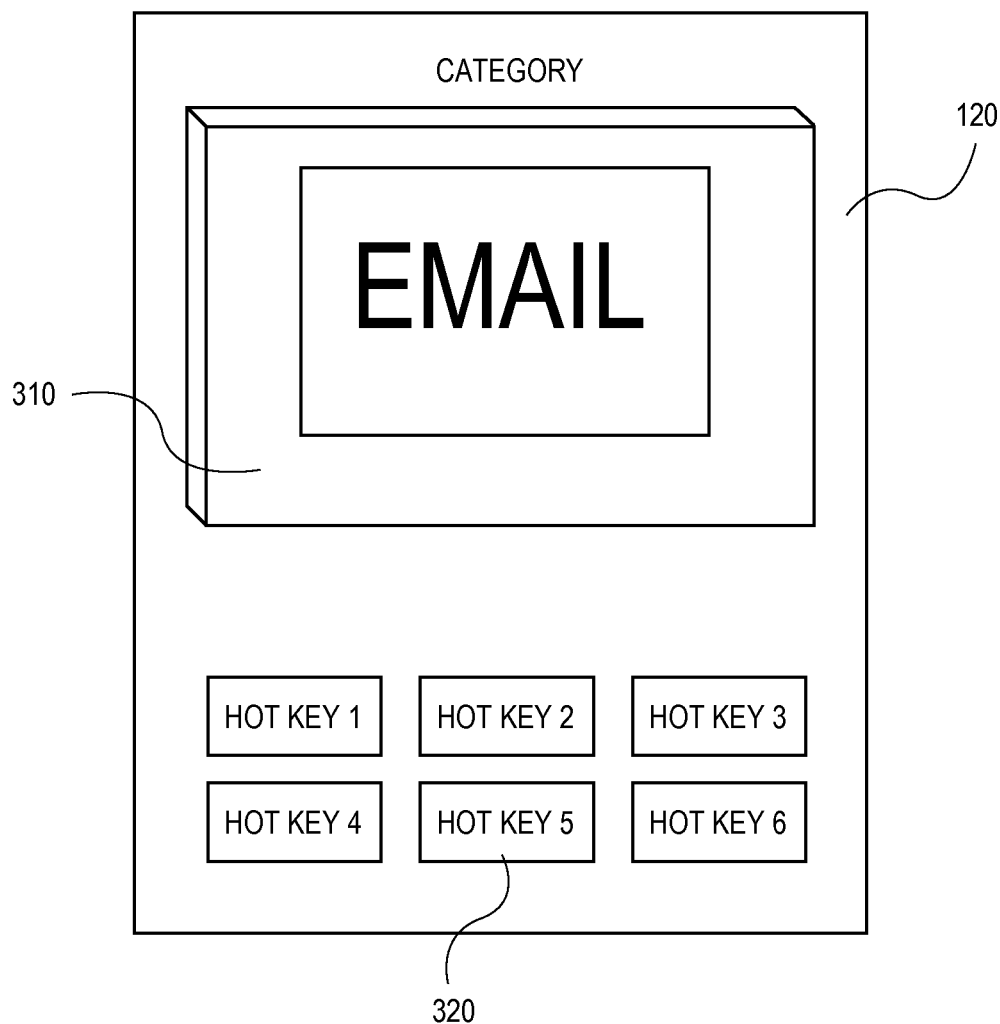
FIG. 3 shows a virtual cube, according to an embodiment of the invention.

FIG. 3 shows a virtual cube, according to an embodiment of the invention. A 'virtual cube', as the term is used in this document, indicates that an image of the cube is shown on the two-dimensional display, that the two-dimensional image of the cube is nonetheless supposed to represent a cube having more than two dimensions, and that various faces of the cube may be displayed on that two-dimensional display. In some embodiments only a single face of the cube may be visible on the display at one time. In other embodiments, two or more faces may be shown on the display at one time, although some of the faces may be shown at such a sharp angle that only one face is readable. This is the example shown in FIG. 3, in which three adjacent faces are visible, but only the front face is readable. Within this document, the term 'cube' means 'virtual cube', unless specifically indicated as a physical cube.

In this example, touchscreen 120 may correspond to touchscreen 120 of FIG. 1, while the images shown within the display may be part of the images shown on touchscreen 120 when the virtual cube is being shown. In particular, the image 310 may represent the face of the cube that is being shown to the user. Near the bottom of the display are shown several 'hot keys' 320, which may be used as shortcuts to various specific applications that could otherwise be accessed by using the cube to sequentially go through several selection steps. Six hot keys are shown, but any feasible number of hot keys may be shown in the display. In some embodiments, additional hot keys may be accessed by moving them into the image in the display through appropriate control mechanisms.

In various embodiments, the mapping between a hot key and its application may be preassigned, may be specified by the user, or may be automatically assigned by the device based on various criteria, such as but not limited to frequency of use. In some embodiments, a hot key may be mapped to another set of selections rather than directly to an application. In some embodiments, the label of each hot key may be changed to something meaningful when the hot key is initially mapped to an application. In other embodiments, the hot key label may remain unchanged. In some embodiments, a hot key may map to the same function regardless of which node(s) within the Category-Application matrix are being displayed at the time.

In FIG. 3, the label "Category" is shown on or above the top of the cube face to remind the user that the icon being displayed on the cube face represents a category, but this should not be considered a requirement. Operating the cube may involve 'rotating' the virtual cube about a vertical axis (rotating the displayed face left or right to produce another face), or rotating the virtual cube about a horizontal axis (rotating the cube face up or down to produce another face). In some embodiments, such movement may be triggered by the user by touching the displayed cube face with a finger or stylus and dragging the finger/styus across the touchscreen in the desired direction. In other embodiments, such movement may be triggered by the user through other suitable controls external to the touchscreen. The term "rotate", as used here, merely indicates the displayed image of the cube is moving from one face of the virtual cube to another, whether or not the displayed image of the cube actually appears to rotate.

Only a single category is shown on the cube face in the example of FIG. 3, and the user may rotate the cube to access the other categories. For example, the user may rotate the cube up or down to sequentially display the categories shown in FIG. 2B. Only a simple label 'Email' is shown to indicate the email category is represented on the cube face. But other embodiments may provide a more elaborate image on the cube face, including a graphics image. Note: the term 'graphics', as used in this document, includes computer-generated images that may be stationary and/or moving, that are presented to the user on a display screen. The presentation of text-only images is generally excluded from the definition of graphics, although text may be included in a graphics image.

The display of FIG. 3 is configured in a vertical, or 'portrait', format (i.e., the vertical dimension is longer than the horizontal dimension). But it may also be configured in a horizontal, or 'landscape', format (i.e., the horizontal dimension is longer than the vertical dimension). For example, in a horizontal format the hot keys might be located to the side of the matrix rather than above or below it. In some embodiments, the device may automatically configure the image in one format or the other depending on whether the device itself is oriented in a horizontal or vertical position. In other embodiments the user may select which format is used.

Figure 4:
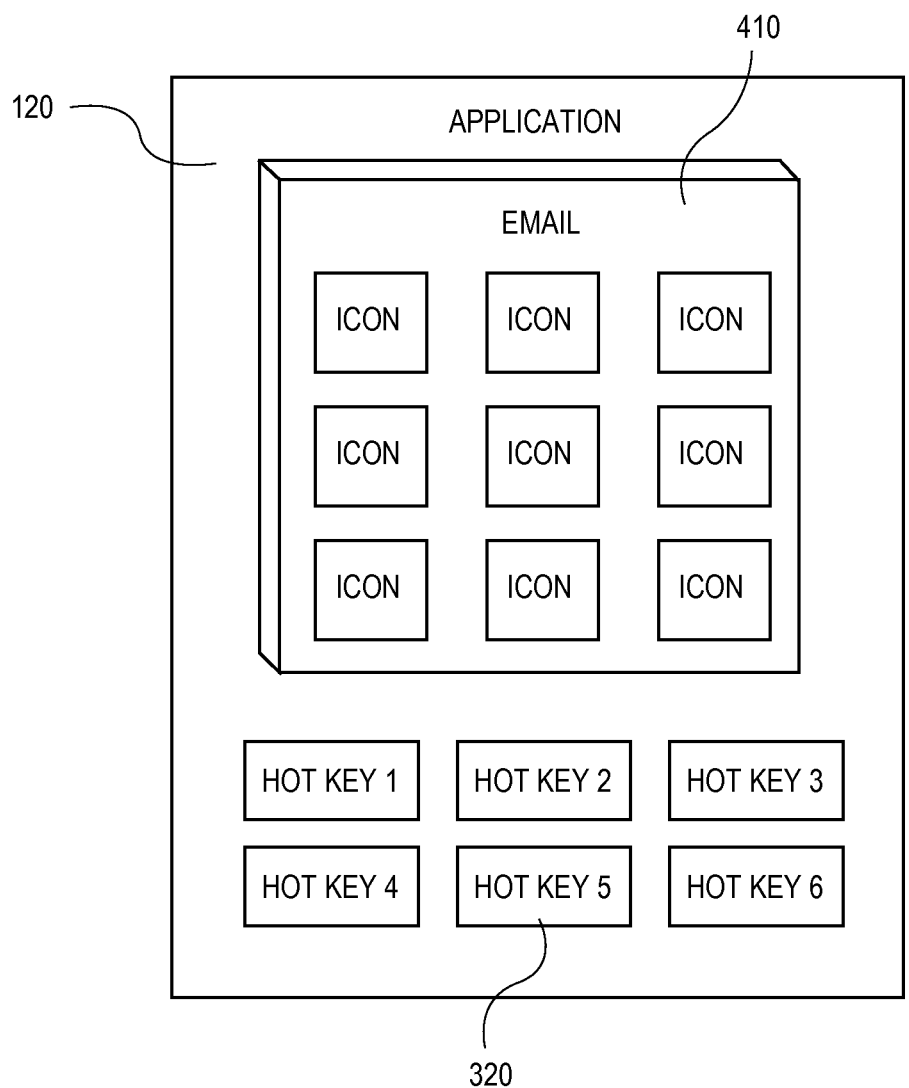
FIG. 4 shows a virtual cube displaying an Application face, according to an embodiment of the invention.

FIG. 4 shows a virtual cube displaying an application face, according to an embodiment of the invention. This image may be similar to that of FIG. 3, except that a group of applications for a specific category is shown on the cube face. If the Email category from FIG. 3 was selected by the user, then the icons shown on this cube face may represent the various applications associated with that category (see FIG. 2B for an example). A matrix of nine icons (three rows by three columns) is shown here, but any feasible number may be displayed at one time. If there are more selections available from the matrix than can be presented on a single cube face, the user may use a scrolling technique to show those additional selections. Various techniques may be available to activate such scrolling, such as but not limited to: 1) a control external to the display 120, 2) a scroll bar on the display, 3) one or more touchable icons on the display, separate from the cube, 4) etc.

After a particular application is selected by touching the associated icon on the face of the cube, that application may be launched and the cube removed from the display.

Various conventions may be followed when rotating the cube. For example, in one embodiment rotating the cube left or right will always move to the next category in order, and will wrap around if the first or last category was shown. Rotating up may always return to the 'Home' category, while rotating down may produce an 'Extras' category not shown in the normal rotation, that includes miscellaneous applications not covered under the other categories. In some embodiments, the effect of a rotation may depend on what is currently shown on the display. Many other conventions may be used without departing from the basic intent of the various embodiments of the invention.

Although the previous description permitted the virtual cube to present a new face by rotating in any of four directions (left, right, up, down) according to a user input motion in the same direction, some embodiments may permit additional rotations in other directions, such as diagonally (e.g., up-left, up-right, down-left, down-right) by providing a user input in those directions. If the rotation input simply produces a new cube face, it may not matter if a physical cube could produce a new face by rotating in that direction.

Alternately, the object displayed may be a virtual polyhedron with more than four sides per face, making it easier for the user to visualize rotating the polyhedron in more than four directions. All the attributes previously described for a cube may also be applied to such a polyhedron. In some embodiments, each permitted direction of rotation ('permitted' meaning there is another selection available by rotating in that direction) may be visually indicated in some manner, while rotations that would produce no further selections will be so marked, will not respond, and/or will produce an error indication. In some embodiments, each straight edge of the displayed face of the polyhedron may indicate another axis about which the polyhedron may be rotated. In some embodiments, the number of sides on that face may change depending on the number of permitted rotations.

Dynamic Clustering of Related Nodes

A handheld electronic device such as that shown in FIG. 1 may perform many different functions for a user, such as but not limited to: 1) allowing the user to communicate with other people, typically through any of several different wireless technologies, 2) having the device communicate with other devices without the user's participation, also typically through various wireless technologies, 3) taking still pictures or video pictures, 4) receiving sounds through a microphone, 5) determining orientation and/or motion and/or location of the device, 6) storing and retrieving information, regardless of where obtained, 7) analyzing inputs and stored data, and 8) presenting information to the user. When these capabilities are combined, the amount of information available to the device may be extremely large, and the amount of information the device is capable of presenting to the user may also be very large.

Various combinations of inputs and data may be obtained, analyzed, merged, and manipulated to produce useful combinations of information that are not directly obtainable through any single information source. Some of the information may be derived from incomplete data, based on probabilities, assumptions, and historical behavior. For this indirect information to be accurate enough to be useful, data from multiple sources should be combined and analyzed, using the aforementioned probabilities, assumptions, and historical behavior. However, the exact data to be processed in this manner may vary considerably, depending on what is to be accomplished and what data is available. Sorting through all the potential data and all the available applications to determine which of those things to focus on can have significant effects on the accuracy and usability of the resulting information.

One approach to this problem is to perform dynamic clustering of related nodes, where a 'node' may be a software application, a selection of data, an internal or external service, input from a sensor, a communications link, an available way to obtain any of these, or any of various other sources of useful data or functionality that can be identified as such. A node is considered 'related' if it provides, or is at least deemed likely to provide, data or functionality that will contribute to the desired result for which the cluster was created. The 'result' is a set of desired information that the user is trying to obtain for a particular purpose, and may also include information that the device has determined might be useful to the user for that particular purpose, whether or not the user has requested it. Further, the results may be presented to the user in any feasible way, such as but not limited to audible (speaker or headphone) and/or visual (touchscreen or other lighted indicators). A 'cluster' is that collection of nodes that have been deemed related to each other for achieving that particular result. Once a cluster is defined, the various nodes in that cluster may collect data, exchange data with each other, process data, share their capabilities to produce the useful results, and take other actions on the related data within or between nodes. The specific interfaces between nodes that facilitate these exchanges is beyond the scope of this document.

The results that the user may be interested in can frequently change, and therefore any particular cluster may be created, have its composition of nodes modified as needed, and eventually be discarded. In addition, multiple such clusters may be in existence at any one time. The fluid nature of this clustering of nodes should therefore be considered dynamic clustering. However, the need for some particular results may be ongoing or repetitive, so some clusters might be considered more or less permanent, either in their existence and/or in their composition of nodes.

The collection of nodes that make up a particular cluster may be determined in two different ways: user-specified and automatic. In the user-defined approach, the user can proactively create a cluster by defining the nodes that should be considered related for this cluster. This collection may be defined from scratch, or there may be a template available to the user to assist in the definition. The template approach recognizes that many types of activities are common among users, so the basic relationships may be predefined, with the individual user adjusting the specific implementation for his/her own needs.

In the automatic approach, the device may perform an analysis to determine the nodes that are considered related, and collect those nodes into the cluster without the user having to specify them. Some of this analysis may be performed based on status awareness.

Another approach may combine the user-defined and automatic approaches, with the user defining some of the nodes, and other nodes being specified by the device. In some embodiments the user may be given a choice to accept, reject, or modify some of the automatically-determined nodes.

As an example of this process, a user may wish to take a vacation trip to another city. After the user specifies the purpose (travel to a remote city), the device may automatically specify a node that enables online airline, hotel, and rental car reservations. The user may modify this by selecting a particular on-line travel site to make those reservations. The user may then specify weather as a factor to be considered, and the device may add a node that tracks the weather conditions (both current and forecast) in both cities and along the travel route. The device can then automatically alert the user if weather conditions deteriorate enough to affect the user's travel plans. The alert may include weather maps and forecasts from the National Weather Service. If rescheduling becomes necessary, the device can use the reservations node to permit the user to change his airline/hotel/rental car plans. The user (or the device) may also specify an airline status node that will monitor the airline's web site on flight days to determine if the user's flight is on schedule.

The user may also select a node that enables entertainment plans in the destination city. The device may obtain information through the internet for restaurants, art galleries, theaters (with show times and ticket information), and other places of interest near the hotel that will be available during the scheduled days in that city, and the device may also take action with those places of interest (e.g., reserve tickets, contact bookstore, etc.). This node may be kept active until the trip is over, in case the user needs to reschedule some of these activities. The user may also select a traffic information node that will alert the user to current traffic conditions when the user is traveling in a car, and a current location node that will tell the device where the user is located, so that only relevant traffic conditions will be noted. On the day of departure, the airline status node may tell the user if his flight is still scheduled to take off on schedule. But when the trip is over, the entire cluster may be deleted, since none of this information will be needed any longer.

Various techniques may be used to permit the user to define the contents of a cluster. When presenting the nodes and potential nodes, the device's display may show them in a text format. For example, sub-nodes may be indented below major nodes. Different fonts, colors, or type sizes may be used to distinguish selected nodes from suggested nodes, mandatory nodes from optional nodes, etc.

Figure 5:
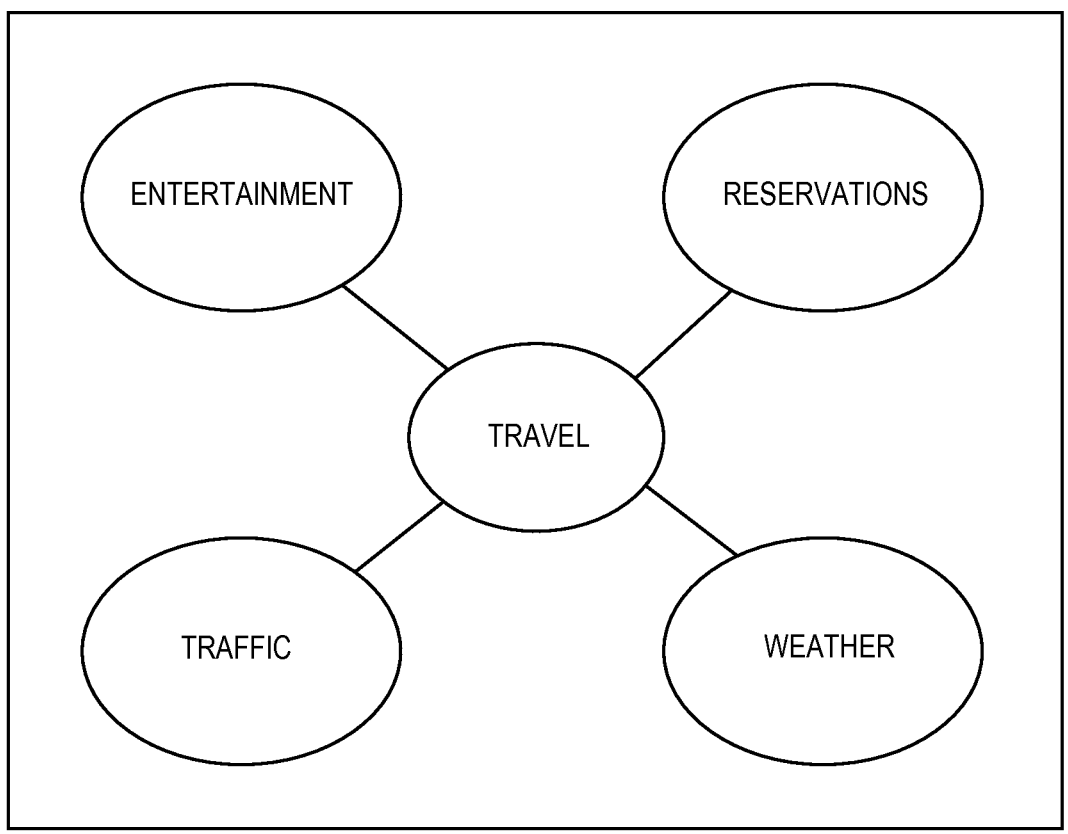
FIGS. 5 and 6 show a graphics format for defining a cluster, according to an embodiment of the invention.
Figure 6:
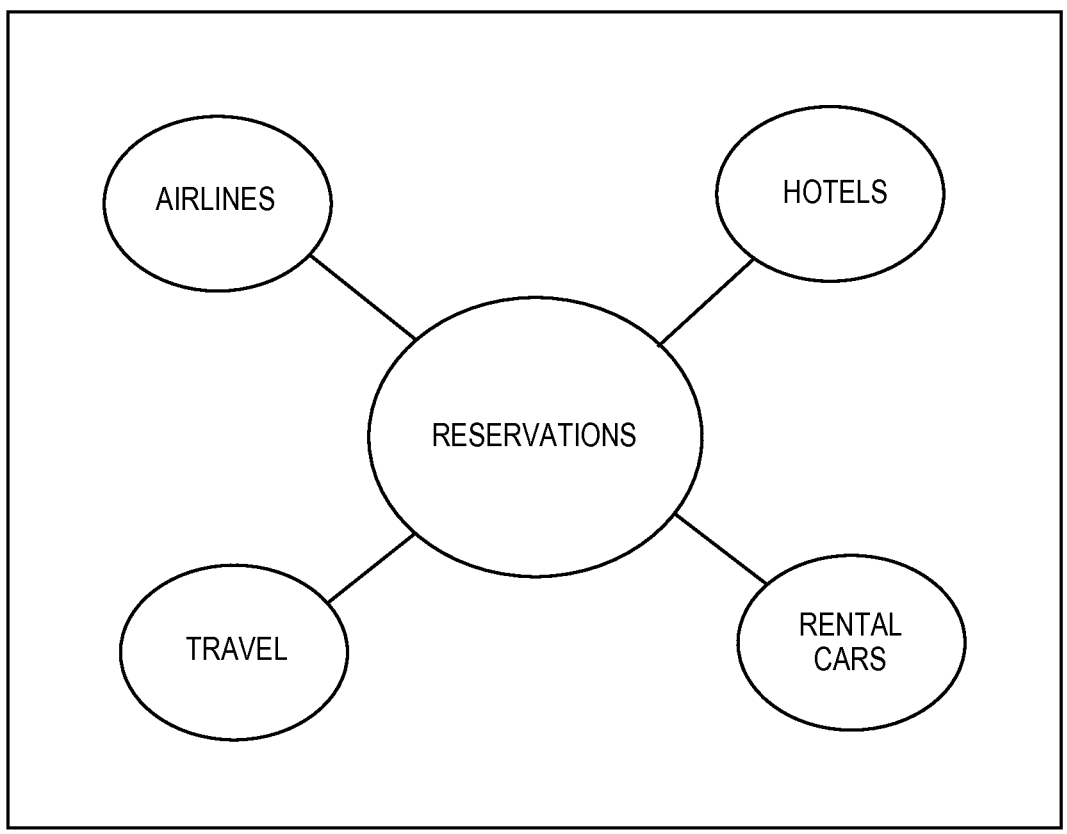

Alternately, the nodes may be presented in a graphics format. For example, FIGS. 5 and 6 show a graphics format for defining a cluster, according to an embodiment of the invention. Using the previous example of a trip to a distant city, creating a cluster for the trip may first call up the display of FIG. 5. The major purpose of "Travel" is shown in a circle in the center, with major nodes for Reservations, Entertainment, Traffic, and Weather shown in other circles connected with lines to the main circle. Different colors or other visual clues might be used to show which nodes are selected or merely suggested, which nodes are mandatory or merely optional, which nodes are primary or secondary, etc.

By touching a particular node, the user may be presented with any other nodes that are, or may be, associated with it. For example, touching the Reservations node may place that node in the center as shown in FIG. 6, surrounded by connected sub-nodes for Airlines, Hotels, and Rental Cars, and of course the previously described Travel node that was already defined as related in FIG. 5. Touching one of those circles may place that node in the center, connected to all the related nodes. This may go on for as many nodes as needed. In some embodiments, the cluster-building process and the operational process may be combined, so that defining the reservations structure and obtaining the reservations may be done in a single session. At some point in that embodiment, selecting a node may lead to an application that initiates action of some kind, external to the cluster-building process. In some embodiments, the same structure that was defined while creating the cluster may also be used at a later time to reach the applications that require the user's inputs (such as making reservations).

Returning to the display of FIG. 5, the user may select the Traffic node to provide current traffic conditions when driving to/from the departure airport and the destination airport, and current traffic conditions when traveling by car near the hotel on the reserved days. A 'current location' function may be automatically included with the Traffic node, so that the device will know where it is at all times that traffic information is needed. Of course, the details of when and where to collect this traffic information won't be known until the airline reservations and hotel reservations are completed, but the node may be selected in the beginning, to be automatically activated at the correct times. The Weather node and Entertainment node may be similarly selected for the cluster earlier than needed.

The structure of nodes that defines a cluster may be modified at any time, either directly by the user, or indirectly by the user when the user makes a change that creates a need for a different structure. The structure may also be automatically modified at any time by the device when the device obtains new information that necessitates a change in that structure. Similarly, even if the structure of the node remains unchanged, the particular actions that are taken may need to be changed. For example, if bad weather closes the destination airport on the first day of the trip, the device may notify the user of such, and call up the reservations node so that flight, hotel, and rental car reservations may be changed.

Although a particular graphics format has been illustrated (with connected circles), other formats may be used instead of, or in addition to, the illustrated example, without deviating from the basic concepts of creating clusters of related nodes for the purpose of collecting and analyzing related data to obtain useful information, and taking action based upon that information.

User Interface with Status-Based Modality

A handheld electronic device may be able to provide a great deal of information that is beneficial to a user, but only a few selected portions of that information are likely to be helpful at any one time to achieve a particular result. With sufficient capability, the device may automatically decide which information might be useful, how to acquire that information, how the acquired information should be filtered and merged, and how the results should be presented to the user. In particular, the method of presenting the information to the user may take several different forms, and the preferred form may depend on various considerations. The user might specify the particular form, but in some embodiments the device may choose the method of presentation based on various observed and inferred conditions. It should be noted here that 'presenting' the information to the user may be interactive, i.e., in addition to communicating information from the device to the user, the user may enter data or react in certain ways that are recognized by the device, and these actions by the user may even affect which data is subsequently communicated from the device to the user and how it is communicated. Communications with another person through the device (e.g., a cell phone call) would be an example, in which voice might be used for some communication, video for additional communication, and the choice of which one would be affected by the user's actions.

Information may be presented in many forms, such as but not limited to: 1) audible (spoken words, music, alarms, other sounds, etc.), 2) displayed photographs or video of real scenes, 3) displayed text, 4) displayed computer-generated graphics (avatars, cartoons, charts and graphs, block diagrams, etc.), 5) combinations of these or other presentation methods. In various embodiments, the particular method of presentation may be chosen based on status awareness, as that term is defined earlier in this document.

Factors that may affect the preferred method of presentation may include, but are not limited to: 1) other current user activities, 2) the importance of those other user activities, 3) the affect of the method of presentation on other people, 4) the effectiveness of each method of presentation in the current environment, 5) etc.

For example, at the time information is being presented to the user by the electronic device, the user may be involved in some other activity that requires physical action, mental computation, or at least mental attention, that would render some types of presentation less effective than others. And the importance of performing that other activity may vary. For example, while driving a car, watching the road ahead is extremely important for safety reasons, and the distraction of a video presentation could be hazardous. On the other hand, looking at a video on the electronic device while sitting in front of a television would involve no safety issues.

The preferred method of presenting information may involve a consideration of how that presentation would affect others. For example, a brightly-lit display on the device might bother nearby patrons in a darkened theater, whereas a dimly-lit display might not. Similarly, an audio message through the device's speaker while in a quiet library might bother surrounding patrons, but the same audio through a headset would not, while either method of audio presentation would not bother others while driving in a car alone. A 'headset', as used here, includes any kind of audio-generating device that is located on or near the user's ear, but cannot be reasonably heard by nearby people. This may include earbuds, 'ear-muff' style head phones, clip-on single-ear head phones, etc.

Another consideration is the likelihood the method of presentation will be effective. Presenting information audibly through a speaker might be hard to hear if the ambient noise level is very high (which could be detected by a microphone on the device), while bright sunlight might wash out the colors on the touchscreen and make a visual presentation hard to see (which could be detected with a light sensor on the front of the device). Neither of those methods would likely be effective under the indicated circumstances.

Figure 7:
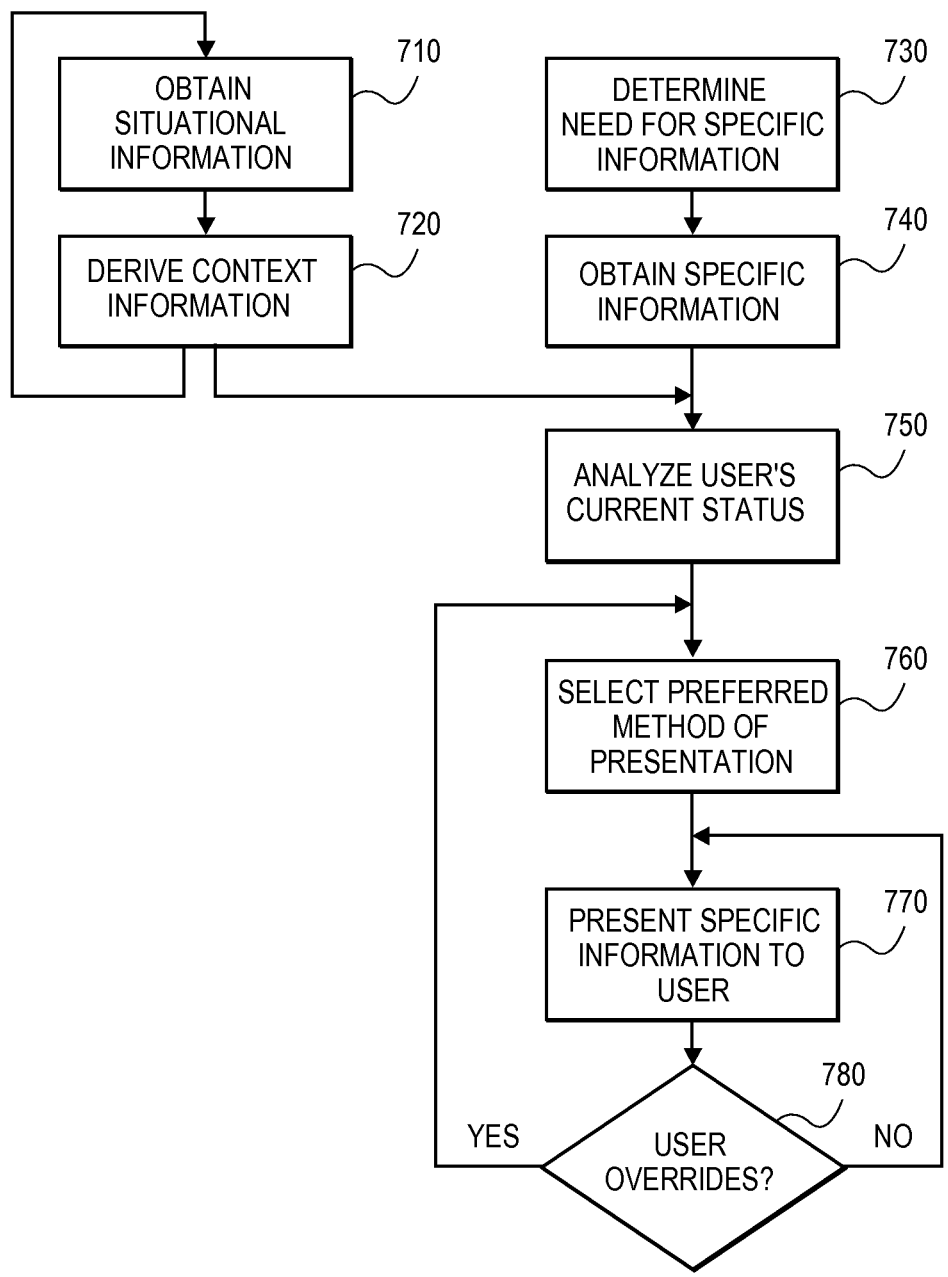
FIG. 7 shows a flowchart of a process for choosing a method of presenting information to a user, according to an embodiment of the invention.

FIG. 7 shows a flowchart of a process for choosing a method of presenting information to a user, according to an embodiment of the invention. In the illustrated example, at 710 the device may perform an ongoing process of monitoring the environment to gain situational information (i.e., situational awareness). At 720, the device may perform an ongoing process of getting context information about the user (i.e., context awareness). Since context awareness may be affected by situational awareness, 710 is shown feeding into 720. Since both may be ongoing processes of gathering and storing information, the loop 710-720 may repeat continuously, repeatedly, or only when called, but in many embodiments it may be an ongoing, interative process of data collection.

Separately, at 730 the device may determine a need for some specific information. Such a request might come directly from the user (e.g., requesting flight information for an upcoming trip), might be a result of an incoming communication (e.g., an incoming call triggers a need to determine how the communication should be handled), or might be a more indirect determination (e.g., the device determines the user should be reminded of an upcoming appointment and requests relevant information). Other scenarios may also generate a need for specific information.

At 740 the device may obtain the specific information needed. The device may use various functionality of obtain the information, and may even use its capabilities for situational and/or context awareness capabilities to obtain that information. But once the information has been obtained, or the device is at least configured to obtain it in a timely manner, the device must determine how to present that information to the user. Towards this goal, the device may analyze the user's current status at 750. This analysis may have been at least partly performed previously in the 710-720 loop. But it may be further refined at 750 after the device know what type of information it needs to present.

Based on this analysis, the device may select the preferred method of presentation at 760, and the device may begin communicating with the user via the selected method at 770. However, in some instances the user may not wish continue with that method, and may override it at 780. In such a case, the device may select the next-preferred method at 760, and continue with that method. In other cases, the user may select the next-preferred method as part of the override action. If the user does not override, the method of presentation may continue unchanged.

The foregoing description is intended to be illustrative and not limiting. Variations will occur to those of skill in the art.

Those variations are intended to be included in the various embodiments of the invention, which are limited only by the scope of the following claims.

What is claimed is:

1. An apparatus for communicating and providing information, comprising:
 a handheld electronic device for operation by a user, the electronic device comprising a processor, a memory, and a touchscreen, wherein the device is to present a graphics display on the touchscreen, the graphics display configured to show multiple icons,
 wherein the icons represent at least a portion of a matrix of selections, with categories represented along one axis of the matrix and applications represented along another axis of the matrix, wherein the icons represent the applications and the categories such that selection of an icon by the user selects a combination including a category and an application, wherein a category includes at least one of an area of interest of a plurality of interests, and data related to the application, wherein the categories correspond to the applications such that the user is allowed to choose a combination of one or more categories and their corresponding one or more applications,
 wherein selection of an icon by the user is to result in operation of the selected application as applied to the selected category, and
 wherein if additional selections are available from the matrix are presented on a first face than there are presented on the first face, displaying the additional selections on the first face using a control external to the graphics display, a scroll bar on the graphics display, or one or more touchable icons on the graphics display, separate from a virtual polyhedron.

2. The apparatus of claim 1, wherein only one category at a time is to be displayed in the graphics display, with a procedure for changing the display from one category to another category, wherein the handheld electronic device displays a next category if rotating the virtual polyhedron left or right, displays a home category first when the matrix is accessed if rotating up, and displays an extras category that includes miscellaneous applications not covered under other categories it rotating down.

3. The apparatus of claim 1, wherein the graphics display is to include additional icons external to the matrix, wherein selection of one of the additional icons is to result in performing an operation that would also be performed by selecting one category and one application from the matrix, wherein the matrix includes a virtual cube capable of being rotated in one or more ways including at least one of rotating physical control wheels, using multi-direction physical control device including at least one of a joystick, a trackball, and a touchpad or touch button to separate from the touchscreen, dragging at least one of a finger, a stylus, and other elements across the touchscreen that shows the virtual cube, and a separate X-Y input device, wherein the matrix is scrolled through to obtain an appropriate combination of the application and the category.

4. The apparatus of claim 1, wherein the virtual polyhedron is a comprises the virtual cube, wherein the applications and the categories associated with the matrix are defined or predefined by at least one of the user, the handheld electronic device based on one or more parameters or considerations.

5. A method of providing information to a user with a handheld electronic device, comprising:
 presenting a graphics display on a touchscreen of a handheld device, the graphics display configured to show multiple icons, wherein the icons represent at least a portion of a matrix of selections, with categories represented along one axis of the matrix and applications represented along another axis of the matrix, wherein the icons represent the applications and the categories such that selection of an icon by the user selects a combination including a category and an application, wherein a category includes at least one of an area of interest of a plurality of interests, and data related to the application, wherein the categories correspond to the applications such that the user is allowed to choose a combination of one or more categories and their corresponding one or more applications, wherein selection of an icon by the user results in operation of the selected application as applied to the selected category, and wherein if additional selections are available from the matrix are presented on a first face than there are presented on the first face, displaying the additional selections on the first face using a control external to the graphics display, a scroll bar on the graphics display, or one or more touchable icons on the graphics display, separate from a virtual polyhedron.

6. The method of claim 5, wherein:
only one category at a time is displayed in the graphics display:
performing a particular procedure changes the display from one category to another category, wherein the handheld electronic device displays a next category if rotating the virtual polyhedron left or right, displays a home category first when the matrix accessed if rotating up, and displays an extras category that includes miscellaneous applications not covered under other categories if rotating down.

7. The method of claim 5, wherein the graphics display includes additional icons external to the matrix, wherein selecting one of the additional icons results in performing an operation that would also be performed by selecting one category and one application from the matrix, wherein the matrix includes a virtual cube capable of being rotated in one or more ways including at least one of rotating physical control wheels, using multi-direction physical control device including at least one of a joystick, a trackball, and a touchpad or touch button to separate from the touchscreen, dragging at least one of a finger, a stylus, and other elements across the touchscreen that shows the virtual cube, and a separate X-Y input device, wherein the matrix is scrolled through to obtain an appropriate combination of the application and the category.

8. The method of claim 5, wherein the virtual polyhedron comprises the virtual cube, wherein the applications and the categories associated with the matrix are defined or predefined by at least one of the user, the handheld electronic device based on one or more parameters or considerations.

9. At least one non-transitory machine-readable medium that contains instructions, which when executed by one or more processors result in performing operations comprising:
presenting a graphics display on a touchscreen of a handheld device, the graphics display configured to show multiple icons, wherein the icons represent at least a portion of a matrix of selections, with categories represented along one axis of the matrix and applications represented along another axis of the matrix, wherein the icons represent the applications and the categories such that selection of an icon by the user selects a combination including a category and an application, wherein a category includes at least one of an area of interest of a plurality of interests, and data related to the application, wherein the categories correspond to the applications such that the user is allowed to choose a combination of one or more categories and their corresponding one or more applications, wherein selection of an icon results in operation of the selected application as applied to the selected category, and wherein if additional selections are available from the matrix are presented on a first face than there are presented on the first face, displaying the additional selections on the first face using a control external to the graphics display, a scroll bar on the graphics display, or one or more touchable icons on the graphics display, separate from a virtual polyhedron.

10. The non-transitory machine-readable medium of claim 9, wherein:
only one category at a time is displayed in the graphics display; and
performing a particular procedure changes the display from one category to another category, wherein the handheld electronic device displays a next category if rotating the virtual polyhedron left or right displays a home category first when the matrix is accessed if rotating up, and displays an extras category that includes miscellaneous applications not covered under other categories if rotating down.

11. The non-transitory machine-readable medium of claim 10, wherein:
the graphics display includes additional icons external to the matrix; and
selection of one of the additional icons results in performing an operation that would also be performed by selecting one category and one application from the matrix,
wherein the matrix includes a virtual cube capable of being rotated in one or more ways including at least one of rotating physical control wheels, using multi-direction physical control device including at least one of a joystick, a trackball and a touchpad or touch button to separate from the touchscreen, dragging at least one of a finger, stylus and other elements across the touchscreen that shows the virtual cube, and a separate X-Y input device, wherein the matrix is scrolled through to obtain an appropriate combination of the application and the category.

12. The non-transitory machine-readable medium of claim 9, wherein the virtual polyhedron in acomprises the virtual cube, wherein the applications and the categories associated with the matrix are defined or predefined by at least one of the user, the handheld electronic device based on one or more parameters or considerations.

* * * * *